May 8, 1951 G. K. PORTER 2,552,381
METHOD OF FORMING JEWEL BEARINGS
Filed June 30, 1944 3 Sheets-Sheet 1

Inventor
George K. Porter
By
Cerstvik + Kalman
ATTORNEYS

May 8, 1951  G. K. PORTER  2,552,381
METHOD OF FORMING JEWEL BEARINGS
Filed June 30, 1944  3 Sheets-Sheet 2
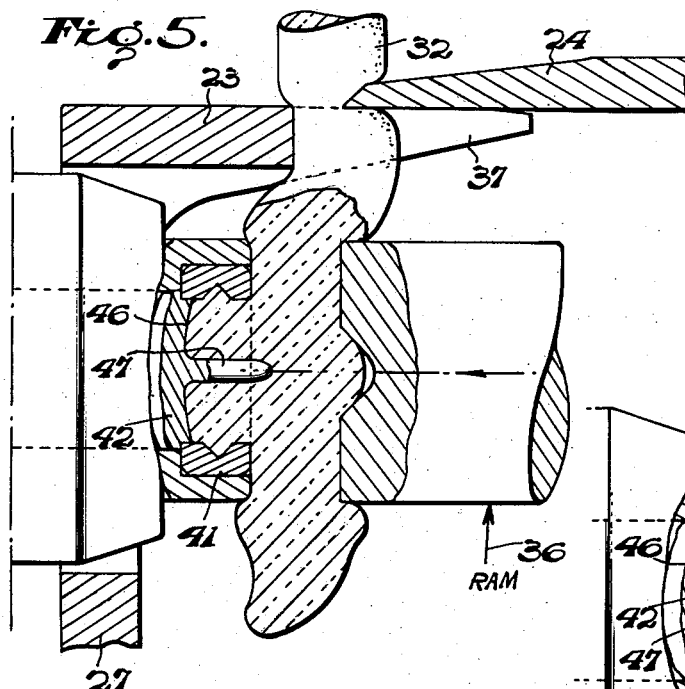
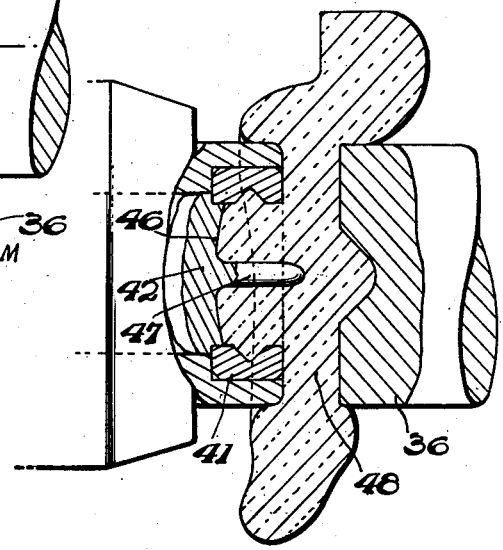
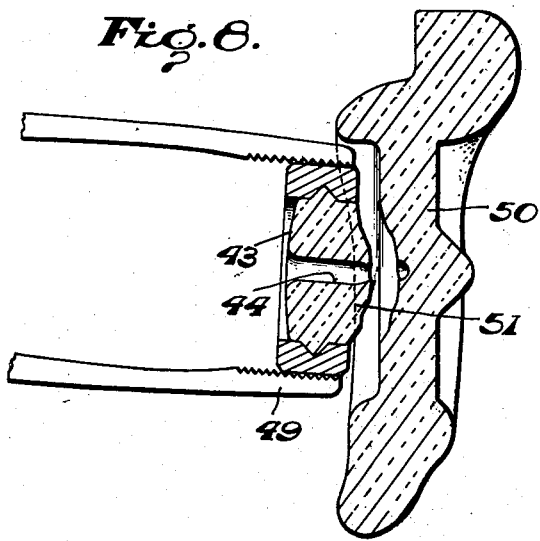
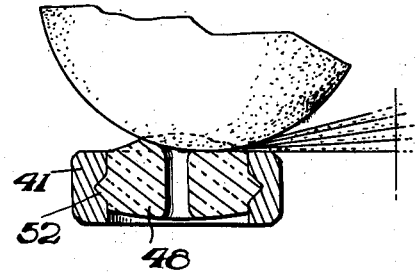
Inventor
George K. Porter
By Cerstvik + Kalman
ATTORNEYS May 8, 1951 G. K. PORTER 2,552,381
METHOD OF FORMING JEWEL BEARINGS
Filed June 30, 1944 3 Sheets-Sheet 3

Inventor
George K. Porter
By
Cerstvik & Kalman
ATTORNEYS

Patented May 8, 1951

2,552,381

UNITED STATES PATENT OFFICE 2,552,381

METHOD OF FORMING JEWEL BEARINGS

George K. Porter, Hatboro, Pa., assignor to Bendix Aviation Corporation, Teterboro, N. J., a corporation of Delaware Application June 30, 1944, Serial No. 543,041

4 Claims. (Cl. 49—77)

This invention relates to mountings or bearings adapted for use with precision instruments and more particularly to a novel method of forming such mountings or bearings.

Generally, the present invention relates to the construction of mountings or bearings of thermoplastic materials, such as glass, for example, and comprises an improved method of feeding or locating the glass and pre-forming a bearing ring, and to a novel method of centrifugally opening to size and oliving a pre-formed tapered hole in the bearing material. For example, the glass ring which may have been partly formed and press fitted by a pair of die members from a section of heated plastic glass rod, as hereinafter described within a bushing with an annular key groove therein, is mounted in a chuck or spring collet that is adapted to be rotated preferably around a vertical centerline at a predetermined number of revolutions per minute. During the rotation of the collet, and bushing with the glass bearing ring therein following the pre-forming step, the back surface of the glass bearing which has been ground off flush with the bushing is subjected to heat from a torch flame, or other suitable heating means. The flame is directed toward the center of the pre-formed opening in the glass, and is maintained at sufficient distance so as not to affect the bombé side of the glass which is down, but close enough so that the back side, which is up, is made plastic centrally around the pre-formed opening.

The flame is not rotated, but the collet and bushing and glass bearing are rotated, with the result that the plastic nature of the heated glass around the opening due to centrifugal force will flow outward and up toward the upper rim of the back of the bushing.

As the plastic portion of the glass thus flows a resultant olive shape opening is formed therein. After the olive opening, as it is commonly called in the art, has been spun to the required size, the bushing with the formed glass in it is removed from the collet and any of the glass extending beyond the bushing rim is ground off and the bearing as a whole is ready to be turned on the metal outside diameter in order to acquire the desired size and concentricity between the hole size of the glass and the outside diameter of the bushing.

Accordingly, an object of the present invention is to provide a novel method of forming glass or similar bearings.

Another object is to provide a novel method of forming bearings from continuous lengths of a thermoplastic rod.

Another object of the present invention is to provide a novel and improved method of opening the bottom side of a partly formed bearing into an olived hole.

Another object is to provide a novel method of centrifugally spreading a thermoplastic mass around an opening while heat treating the mass.

Another object is to provide a novel method of forming a whirlpool or conical depression in the surface of a thermoplastic mass while in a plastic state, until a pool of predetermined size has been obtained in the surface of the mass.

Another object is to provide a novel method of pre-forming bearings of a thermoplastic, which comprises the steps of feeding and rotating a rod of thermoplastic material between a pair of opposed die members, heating the rod opposite the die members to a plastic state, and then compressing the plastic portion of the rod into a bushing, to thereby pre-shape and finish one side thereof, while pre-forming an opening of predetermined size in the compressed plastic portion of the rod in the bushing prior to oliving and finishing the other side thereof.

The above and other objects and advantages of the present invention will appear more fully hereinafter from a consideration of the following description, taken together with the drawings. It is to be expressly understood, however, that the drawings are for the purpose of illustrating the several steps of the present novel methods hereinbefore outlined, and are not designed to show any indispensable structure for the practice of the present invention.

In the drawings wherein like reference numerals refer to like parts throughout the several views;

Figure 5 is a side view partly in elevation and partly in cross section of the actual pressing operation before the ram has made its complete stroke, and showing the glass rod cut about half way through by the shear.

Figure 6 shows the ram advanced all the way, so that the plastic portion of the rod is pressed into the bushing and the bombé surface and tapered hole have been formed.

Figure 8 is a cross sectional view of a pin vise adapted to grip the bushing, whereby said excess glass is broken off.

Figure 9 is a longitudinal cross section view taken through the bushing and partially formed bearing therein, together with a side elevation view of a grinding wheel adapted to grind off the bearing material flush with the bushing rim.

Figure 1:
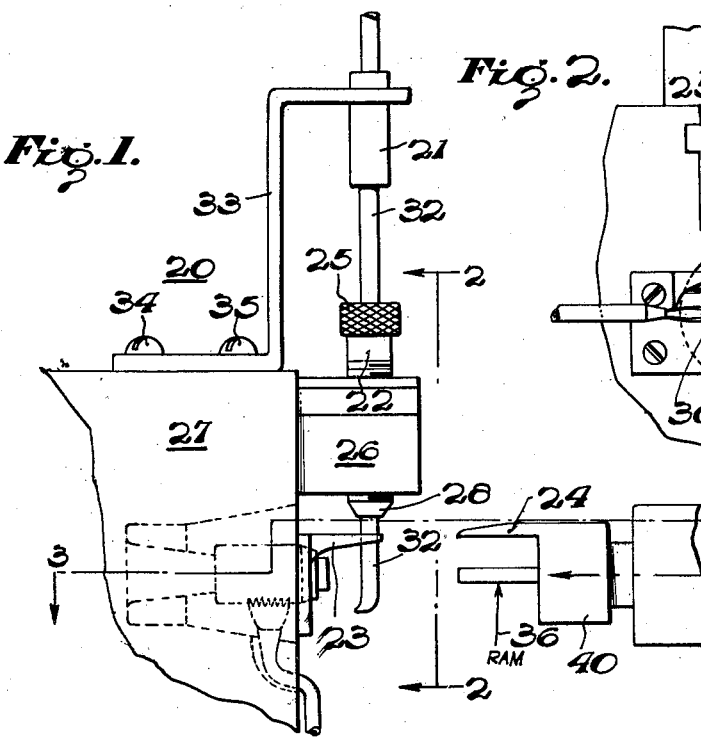
Figure 1 shows the side elevation of the machine head stock showing the mandrel pilot for the forming of the bombé side, and the shear, the ram, and the rod in position just prior to molding.

Referring to Figure 1 of the drawings, the bearing pre-forming apparatus 20 includes a glass rod feeding apparatus having a pair of aligned guide bushings 21 and 22 arranged above shear parts 23 and 24.

Figure 2:
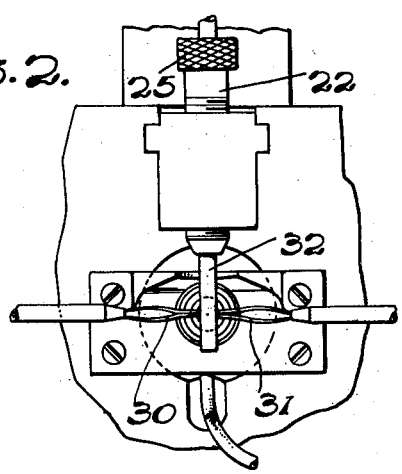
Figure 2 is an end view taken along the line 2—2 of Figure 1, showing the cross fire means for reducing the rod to a plastic state just prior to molding.

The lower guide bushing 22 at its upper end has a knurled knob 25 and is externally threaded through block 26 secured to the headstock 27, whereby the tube outlet end 28 of bushing 22, may be adjusted toward and away from the cross fires 30 and 31, shown in Figure 2.

Such adjustment regulates the rod lengths to be exposed to cross fires 30 and 31. As the rod 32 is fed forward to locate a portion thereof between the cross fires it is slowly revolved by any suitable means, as by hand, while being heated to a temperature of approximately 1800° Fahrenheit, after which a ram 36 is fed forward, as hereinafter explained.

The upper guide bushing 21 is secured in bracket 33 attached to headstock 27 by suitable means, such as bolts 34 and 35.

Figure 3:
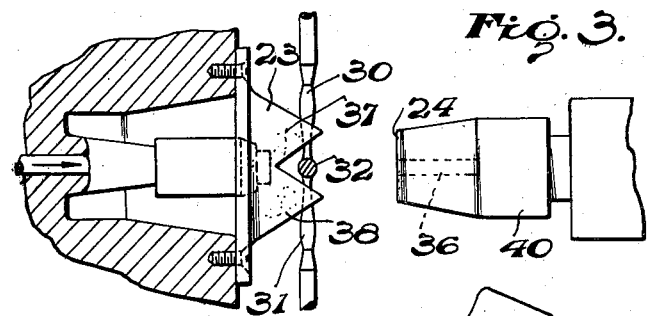
Figure 3 is a top view partly in cross section taken along the line 3—3 of Figure 1.
Figure 4:
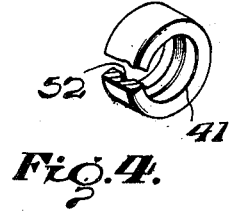
Figure 4 is an isometric drawing of the bushing into which the bearing is to be molded.

The shear parts are best shown in Figure 3. Part 23 is stationary and may be of saw tooth construction, it being arranged so that rod 32 extends and cradles between the two teeth 37 and 38. Thus when the movable shear blade 24 which is carried by ram head 40, above and substantially parallel with ram 36, is moved forward, a section of rod 32 at the point it is cradled between teeth 37 and 38 will be sheared off. As the ram 36 is also simultaneously brought forward a portion of the sheared off glass rod, which at this stage has been reduced to a plastic state by cross fires 30 and 31, see Figure 2, is pushed into a bushing 41 mounted in mandrel 42, see Figures 5 and 6.

The mandrel 42, which holds the bushing 41 is shaped so as to form the bombé face 43 and a slightly tapered hole 44 through the glass, as it is pressed into the bushing 41. For example, the mandrel 42 comprises a concave surface 46 with a centrally projecting tapered pin 47, adapted to provide for the pre-forming of the bombé side of the bearing and the tapered hole therein, note Figures 5, 6 and 8.

Figure 7:
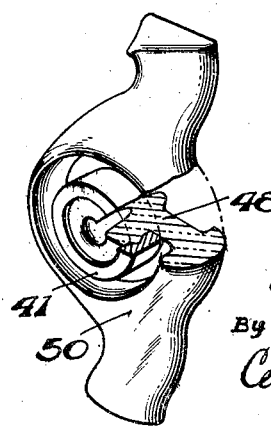
Figure 7 is a perspective view of the glass globule, bushing and partly formed bearing therein after retraction of the ram.

Figure 5 illustrates the actual pressing of the plastic material or glass into the bushing 41 seated in mandrel 42, after the shear blade 24 has cut about half way through the glass rod 32. Then, as is shown in Figure 6, after the ram 36 has advanced to the end of its stroke and the rod sheared off, the ram is retracted by any suitable means, not shown, and the shear blade 24 retracts with it. The glass globulite 48 so formed and which contains the bushing 41 is next ejected from the mandrel 42, see Figure 7.

Figure 11:
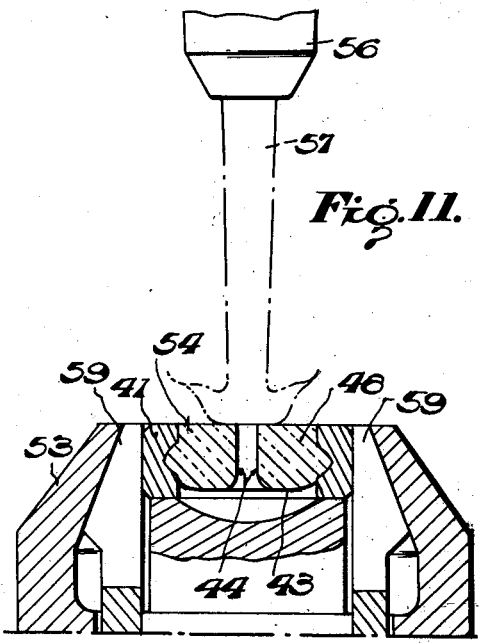
Figure 11 is a cross section view of a collet showing the bushing and the partially formed bearing clamped therein in the vicinity of the torch and flame, arranged for heating the bearing during rotation of the collet.

This glass globulite 48 is next cooled, along with bushing 41, and the outside diameter of the bushing is gripped in a pin vise 49, see Figure 8, and the excess glass 50 is broken off. This leaves an irregular amount of excess glass 51 protruding from the back of the bushing 41. The remaining glass 48 is now held firmly in the bushing 41 by the annular groove 52 therein, and the excess glass is then removed by grinding, as shown in Figure 9, until its back surface 54 is flush with the back of bushing 41, as shown in Figure 11.

This partially formed bearing as it comes from the molding machine and back grinder, as shown in Figure 9, is next placed in collet 53 for the novel oliving steps, as hereinafter described.

Figure 10:
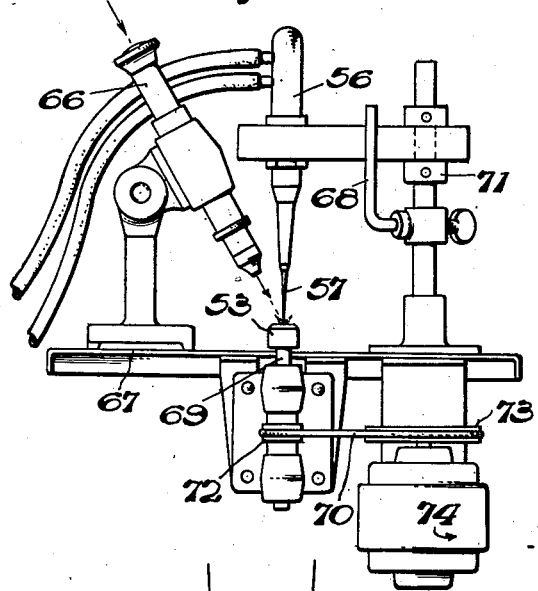
Figure 10 is a general side elevational view of the overall mechanism provided for oliving and finishing the bearing.

Referring to Figure 10 of the drawings, numeral 56 represents a torch connected from a source of fuel, such as a mixture of hydrogen and oxygen, so as to produce a flame 57, adapted to provide heat at or about 1600° Fahrenheit.

Mounted directly below the torch 56, is a rotary member, such as the chuck or collet 53, having jaws 59, of any suitable design adaptable to clamp the bushing 41.

The thermoplastic material such as glass 48, as previously explained has been partly formed and compressed into the bushing 41 while still plastic, so that it will flow into the annular groove 52 in the bushing 41 thereby locking the glass ring 48 therein.

As previously outlined, the glass or thermoplastic ring 48 has been formed as shown by numerals 43 and 44 in Figure 11, by ram 36 and mandrel 42, but which may be adapted to provide not only the molded bombé shape 43 and the hole 44, but any other desired shape. The hole 44, is an inwardly tapering aperture formed centrally by the above mentioned ram and mandrel or die members from the molded bombé side when the bombé was formed, as hereinbefore described.

Figure 12:
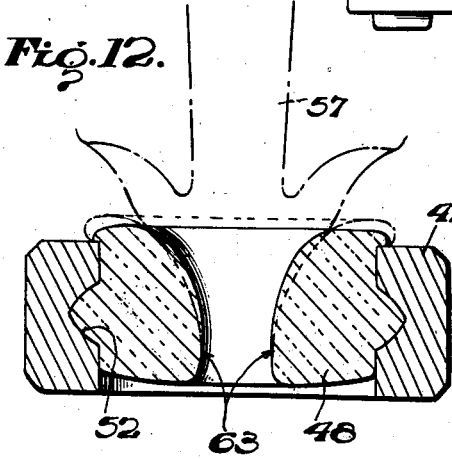
Figure 12 is a cross section view showing how the bearing material spreads outwardly over the edges of the bushing by centrifugal action when rendered plastic by the pin flame.

The next step is to provide the olived opening starting at the back surface 54, Figure 11, and running through until tangency is obtained at numeral 63, Figure 12. This tangency may be located within any desired limits along the tapered bore of hole 44. This shape is necessary in order to obtain a minimum of frictional contact of the bearing material 48 with the shaft 64 and bearing 65, see Figure 15, which is to be mounted thereon in any usual well-known manner.

Now referring to Figure 10, the assembled mechanism is shown for opening and oliving the pre-formed glass ring in bushing 41, and comprises a microscope 66 mounted on a base 67 on which also is mounted the torch 56 capable of producing a pin point of flame 57. The characteristics of the flame 57 are sufficient to raise the thermoplastic or glass bearing material 48 to a temperature of approximately 1600° Fahrenheit. Torch 56 is mounted, for example, on a swivel 71, so that it may be removed expeditiously from the vicinity of the tapered hole 44. If desired, a stop arm 68, may be provided to limit the swivel movement of the torch 56.

The pre-formed bearing comprising the bushing 41 and the glass ring filling 48 is mounted in the collet 53, which is adapted to be rotated by spindle 69 connected by belt 70 around pulleys 72 and 73 carried by the spindle and a drive means, such as motor 74, respectively.

The spindle 69 is then thus rotated at an appropriate speed such as between 40,000 R. P. M. and 100,000 R. P. M., for example, and the torch 56 is swiveled to a position directly over the hole in the glass ring 48. Due to the heat applied from the flame 57 and the centrifugal force, a portion of the glass flows upward, that is, lengthwise of the aperture and transversely to the plane of the ring, and outward, that is, radially of the ring, as shown in Figure 12, thus forming a true olived surface.

The location of the flame 57 in relation to the bombé surface 43 is so controlled that the heat from the flame 57 does not affect the shape or finish of the molded bombé side.

When enough of the glass forming the olived hole has been moved outward and upward to reach that portion of the tapered hole 44 formed by the forming mandrel, which is of the proper hole size required for the finished hole the flame 57 is removed.

Figure 13:
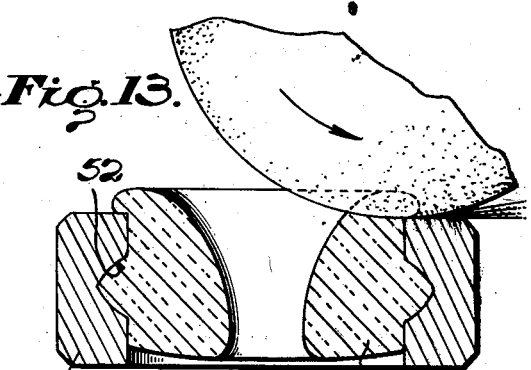
Figure 13 is a cross section of the bearing and bushing after the opening therein has been olived to desired size, showing a grinding wheel in side elevation for removing all overlapping bearing material to finish said bearing surface off flush with the bushing rim.
Figure 14:
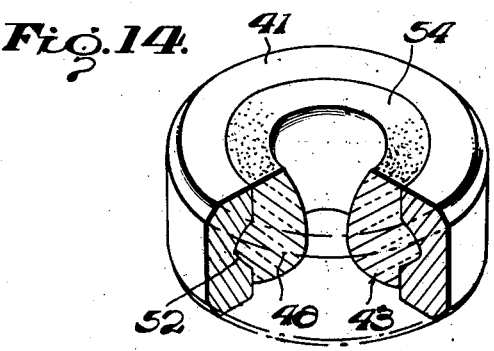
Figure 14 is an isometric view partly in cross section of the finished bearing.

The size of the hole is controlled by timing. When the above heating and centrifugal oliving or casting step has been completed and the proper hole size thus attained, there is again an excess amount of glass above and beyond the back face of the bushing 41, which has been caused by the flowing outward and upward of the glass while the olived hole was being formed. This excess material is next removed by grinding, as shown in Figure 13, and Figure 14 shows the finished bearing with the back face or ground side 54 up.

Figure 15:
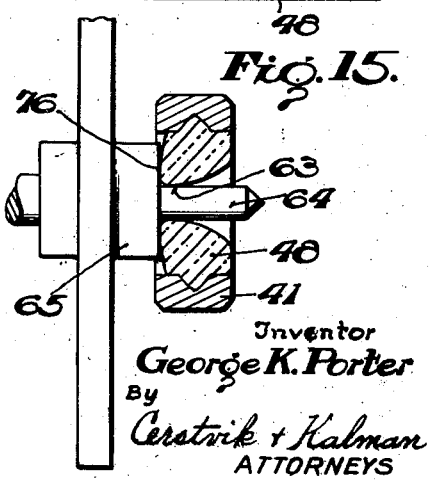
Figure 15 shows the finished bearing of Figure 14 applied to an instrument spindle.

The bearing including bushing 41 and glass insert 48 may now be applied, as shown in Figure 15, to shaft 64 and against bearing 65, with the single line contact 76 of the bombé surface 43 taking the thrust load, and the single line contact 63 of the olived hole taking the radial load.

It is to be understood that in the molding operation the forming mandrel 42 must have at a specified distance from the highest point on the bombé side 43, a diameter which is suitable to produce the hole size desired for the bearing to be manufactured.

As shown in Figure 12, when the oliving operation is being performed, the flame is removed just as the above-mentioned formed diameter has been reached, thus creating a perfect tangency at 63 that shows no joint, flash or any other imperfection.

The term "oliving" and its derivatives as used throughout the specification is a term peculiar to the jewel bearing trade and may be found in Swiss and French dictionaries. The term is directed to the rounding of the internal bore of a jewel so as to present a single line of contact with the staff to reduce friction.

There is thus provided a novel method designed to economically and rapidly produce a new improved jewel bearing for precision instruments, which has high quality of performance and durability.

While only one novel arrangement of apparatus has been illustrated and described, and while the description of the novel method is confined to conform with the accompanying drawings, it is to be understood that other changes and modifications, which will now appear to those skilled in the art, may be made without departing from the scope of the present invention. For example, the bushing 41 may, if desired, be removed from the finished glass bearing before it is applied to an instrument shaft. Reference is, therefore, to be had to the appended claims for a definition of the limits of the present invention.

What is claimed is:

1. In the method of making a bearing from a thermoplastic body set in a ring and having a pre-formed axial aperture and finished front side portion, which method comprises the following steps: confining the thermoplastic body in said ring and rotating the same about an axis disposed in alignment with said pre-formed aperture, and exposing the back side surface of said thermoplastic around the pre-formed aperture to plastic forming temperatures independently of said finished front side, while the same is rotating, so as to enlarge said aperture by centrifugal action in the back side surface of the thermoplastic, and timing the period of exposure to plastic forming temperatures to control the size of the aperture, and then finishing the bearing by grinding the back surface of the thermoplastic flush with the rim of the ring.

2. A novel method for forming jewel bearings from rods of thermoplastic material, which comprises the steps of feeding and rotating continuous lengths of a rod of such material between a pair of opposed die members, heating a section of the rod opposite the die members to a plastic state, then pressing the heated rod section while plastic into a bushing seated in one of the said die members to thereby pre-shape and finish one side of the bearing and form an aperture therein tapering from said finished side, then grinding off the excess material from outside the bushing of the unfinished side, then heating and rotating said bushing with said material therein with the unfinished side of said material exposed to the heat to make it plastic, and then removing the heat and stopping the rotation thereof after a predetermined period of rotation.

3. A novel method for forming jewel bearings from rods of thermoplastic material, which comprises the steps of feeding and rotating continuous lengths of a rod of such material between a pair of opposed die members, heating a section of the rod opposite the die members to a plastic state, then pressing the heated rod section while plastic into a bushing seated in one of the said die members to thereby pre-shape and finish one side of the bearing and form an aperture therein tapering from said finished side, then grinding off the excess material from outside the bushing of the unfinished side and subsequently oliving an opening in the unfinished side to a size and depth desired along the wall of the pre-formed tapered aperture by heating and rotating the bushing and material contained therein, and then subsequently grinding off any excess material extending over or above the flush back surface of the bushing to provide the finished bearing.

4. A novel method for forming jewel bearings from a rod of thermoplastic material, which comprises the steps of feeding and rotating successive lengths of a rod of such material between a pair of opposed die members, heating a section of the rod opposite the die members to a plastic state, then pressing the heated rod section while plastic into a bushing seated in one of said die members to thereby pre-shape and finish one side of the bearing and form an aperture therein tapering from said finished side, then heating and rotating said bushing with said material therein with the unfinished side of said material exposed to the heat to make it plastic, and then removing the heat and stopping the rotation after a predetermined period.

GEORGE K. PORTER.

REFERENCES CITED

The following references are of record in the file of this patent:

UNITED STATES PATENTS

| Number | Name | Date |
| --- | --- | --- |
| 493,808 | Bechtold | Mar. 21, 1893 |
| 742,345 | Mygatt | Oct. 27, 1903 |
| 756,935 | Burrows | Apr. 12, 1904 |
| 966,784 | Anderson | Aug. 9, 1910 |
| 1,721,983 | Bailey | July 23, 1929 |
| 1,993,774 | De Bats | Mar. 12, 1935 |
| 2,085,751 | Holtz | July 6, 1937 |
| 2,285,181 | Wines | June 2, 1942 |
| 2,368,170 | Smith | Jan. 30, 1945 |